US006955359B2

(12) United States Patent
Yamamoto et al.

(10) Patent No.: US 6,955,359 B2
(45) Date of Patent: Oct. 18, 2005

(54) SEAL ASSEMBLY AND CRAWLER-TRACK CONNECTION STRUCTURE

(75) Inventors: Teiji Yamamoto, Osaka (JP); Akira Hashimoto, Osaka (JP); Hiroyuki Nakaishi, Osaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/461,369

(22) Filed: Jun. 16, 2003

(65) Prior Publication Data

US 2003/0214101 A1 Nov. 20, 2003

Related U.S. Application Data

(62) Division of application No. 09/817,365, filed on Mar. 22, 2001.

(51) Int. Cl.[7] .............................. F16J 15/32
(52) U.S. Cl. ................. 277/565; 277/549; 277/562
(58) Field of Search ................. 277/565, 549, 277/562

(56) References Cited

U.S. PATENT DOCUMENTS

| | | | | |
|---|---|---|---|---|
| 2,401,539 A | * | 6/1946 | Benson ........................ 277/556 |
| 2,877,029 A | | 3/1959 | Peguet et al. ............. 286/11.15 |
| 3,195,421 A | | 7/1965 | Rumsey et al. ................ 92/122 |
| 3,241,843 A | | 3/1966 | Hatch et al. .................. 277/92 |
| 3,492,054 A | | 1/1970 | Boggs et al. .................. 305/11 |
| 3,675,936 A | | 7/1972 | Hatch ........................... 277/94 |
| 3,838,896 A | | 10/1974 | Kawamura et al. ........... 305/11 |
| 4,030,730 A | * | 6/1977 | Maguire ...................... 277/380 |
| 4,089,534 A | | 5/1978 | Litherland ................... 277/188 |
| 4,120,537 A | | 10/1978 | Roley et al. ................... 305/14 |
| 4,311,346 A | | 1/1982 | Danner ......................... 305/11 |
| 4,426,091 A | | 1/1984 | Baylor ......................... 277/83 |
| 4,461,488 A | * | 7/1984 | Harms et al. ................ 305/103 |
| 4,568,090 A | | 2/1986 | Westemeir .................... 277/84 |
| 4,648,776 A | * | 3/1987 | Hradil et al. ................ 414/565 |
| 4,688,805 A | | 8/1987 | Crotti et al. ................... 277/84 |
| 4,699,387 A | * | 10/1987 | Buseth ....................... 277/167.5 |
| 5,069,509 A | | 12/1991 | Johnson et al. ............... 305/58 |
| 5,183,318 A | | 2/1993 | Taft et al. ...................... 305/39 |
| 5,390,997 A | | 2/1995 | Nakaishi et al. .............. 305/11 |

* cited by examiner

*Primary Examiner*—Enoch Peavey
(74) *Attorney, Agent, or Firm*—Armstrong, Kratz, Quintos, Hanson & Brooks, LLP

(57) ABSTRACT

A seal assembly has simple assembly structures, and provides secure sealing effects. A crawler-track connection structure allows the seal assembly to be easily mounted, and securely prevents overflow of a lubricant and the like to the outside. A pair of seal rings (1) and (1) individually having lip portions (23) and (23) are disposed such that each of the lip portions (23) and (23) protrudes in a direction opposing an axial direction, and a load seal ring (2) is compressed and inserted between the pair of seal rings (1) and (1). The load seal ring (2) exerts reaction forces on the pair of lip portions (23) and (23) outwardly in the axial direction.

3 Claims, 7 Drawing Sheets

SEAL ASSEMBLY AND CRAWLER-TRACK CONNECTION STRUCTURE

CROSS-REFERENCE TO RELATED APPLICATION

This application is a Divisional application of U.S. application Ser. No. 09/817,365, filed Mar. 22, 2001, and is hereby incorporated by reference.

BACKGROUND OF THE INVENTION

1. Field of the Invention

The present invention relates to a seal assembly and a crawler-track connection structure.

2. Description of the Related Art

Generally, as shown in FIG. 6, a crawler vehicle such as a construction machine, e.g., a bulldozer tractor or a hydraulic shovel tractor, has an endless link chain 81 and a plurality of ground-contacting shoe plates (not shown) mounted on the link chain 81. The link chain 81 comprises a plurality of links 82a, ... and 82b, ... that are disposed parallel to each other, and a crawler-track connection structure 84 for pivotably connecting the links 82a and 82b opposing each other. Specifically, the links 82a and 82b comprise an intermediate portion 85 where the shoe plates (not shown) are mounted, and connecting portions 86 and 87 protruding from the intermediate portion 85. A pin insertion opening 88 is provided in the connecting portion 86, and a bushing insertion opening 89 is provided in the connecting-portion 87. The links 82a and 82a and the links 82b and 82b are individually connected together via the crawler-track connection structure 84 such that the connecting portion 86 and the connecting portion 87 are overlapped with each other.

The crawler-track connection structure 84 comprises a pin 90 and a bushing 91 externally fitted around the pin 90. End portions of the pin 90 extend outward from the bushing 91 in the axial direction, and the pin 90 is press-fitted into the pin insertion opening 88 of the link 82. End portions of the bushing 91 are press-fitted into the bushing insertion openings 89. An opening portion of the pin insertion opening 88 on the side of the bushing is formed as a large-diameter portion 92. Space portions 94 are formed by the large-diameter portion 92, an outer end surface of the bushing 91, and an outer peripheral surface 93 of the pin 90. A seal assembly 95 is fitted into the space portion 94. In this case, the bushing 91 is externally fitted to be rotatable around the pin 90, the pin 90 is unitized with the connecting portion 86, and the bushing 91 is unitized with the connecting portion 87. Thereby, end portions of the links 82 and 82 to be connected, i.e., the connecting portions 86 and 87, are pivotably connected together. In addition, an oil injection opening 96 is provided in the pin 90. Oil in the oil injection opening 96 flows to the side of the outer peripheral surface 93 of the pin 90 through a path (not shown) and serves as a lubricant between the pin 90 and the bushing 91.

As shown in FIG. 7, the seal assembly 95 comprises a seal ring 98 having a lip portion 97, a support ring 99 for supporting the seal ring 98, and a load ring 100 for receiving a pressure from the lip portion 97 of the seal ring 98. Thereby, the seal assembly 95 prevents overflow of the aforementioned lubricant to the outside.

In the above-described conventional crawler-track connection structure, to cause the lip portion 97 to press-engage with a corresponding wall (an end surface of the bushing 91 in FIG. 6), the load ring 100 needs to receive a pressure from an outer peripheral side thereof. Therefore, in the conventional structure, housings (space portions 94) need to be formed to insert the seal assembly 95, thereby complicating the overall structure that makes the manufacturing processing to be difficult. In addition, since the seal assembly 95 must be inserted in the space portions 94, the overall assembly requires complicated steps, thereby reducing the productivity.

SUMMARY OF THE INVENTION

The present invention is made to solve the above-described problems with the conventional case. Accordingly, an object of the invention is to provide a seal assembly that has a simple assembly structure and that provides secure sealing effects. Another object of the invention is to provide a crawler-track connection structure that allows the seal assembly to be easily mounted, and in addition, that securely prevents overflow of a lubricant and the like to the outside.

To these ends, according to first aspect of the invention, a seal assembly comprises a pair of seal rings 1 and 1 individually comprising lip portions 23 and 23 disposed such that each of the lip portions 23 and 23 protrudes in a direction opposing an axial direction; and a load seal ring 2 compressed and inserted between the seal rings 1 and 1, the load seal ring 2 exerting reaction forces on the lip portions 23 and 23 outwardly in the axial direction.

In the seal assembly according to the first aspect of the invention, with an axial-direction compressive force being exerted on the load seal ring 2, the load seal ring 2 presses the respective lip portions 23 and 23 of the seal rings 1 and 1 outwardly in the axial direction. Therefore, when the seal assembly is mounted between walls that form a gap of which the length is less than the axial-direction length of the seal assembly in a free state, the individual lip portions 23 and 23 are press-engaged with the corresponding walls, thereby allowing an inner-diameter side and an outer-diameter side of the lip portions 23 and 23 to be hermetically enclosed. That is, with the seal assembly, assembly thereof into a crawler-track connection structure and the like can easily be performed to thereby improving the efficiency in the assembly work.

The seal assembly according to the first aspect of the invention may further comprise an outer-diameter controller body 32 for controlling the displacement of the load seal ring 2 in a periphery outer direction.

In this case, the displacement of the load seal ring 2 in the periphery outer direction can be controlled by the outer-diameter controller body 32, and reaction forces of the load seal ring 2 in the axially-outer direction can be securely exerted on the lip portions 23 and 23. Thereby, conventionally required outer-peripheral-side controller walls (space portions 94 shown in FIG. 6) can be avoided. That is, processing for spaces used for mounting a seal assembly S is not required. This facilitates manufacturing processing, and concurrently, allows high-precision sealing effects to be provided.

The seal assembly according to the first aspect of the invention may further comprise an inner-diameter controller body 32 for controlling the displacement of the load seal ring 2 in a periphery inner direction, In this case, the displacement of the load seal ring 2 in the periphery outer direction can be controlled by the inner-diameter controller body 32, and reaction forces of the load seal ring 2 in the axially-outer direction can be securely exerted on the lip portions 23 and 23. In addition, the inner-diameter controller body 33 functions as a spacer disposed in an inner-diameter side of the seal assembly to thereby allow a mounting portion of the seal assembly to easily be secured.

In the seal assembly according to the first aspect of the invention, one of the seal rings 1 and 1 may comprise the outer-diameter controller body 32 for controlling the displacement of the load seal ring 2 in the periphery outer direction, and the other one of the seal rings 1 and 1 comprise the inner-diameter controller body 32 for controlling the displacement of the load seal ring 2 in the periphery inner direction.

In this case, the displacement of the load seal ring 2 in the periphery outer direction can be controlled by the outer-diameter controller body 32, and the displacement of the load seal ring 2 in the in the periphery inner direction can be controlled by the inner-diameter controller body 33. Reaction forces in the axial direction according to the load seal ring 2 can be securely exerted on the lip portions 23 and 23. Therefore, a higher-precision function can be produced.

In the seal assembly according to the first aspect of the invention, the load seal ring may comprise a circumferential groove 27 that tolerates axial-direction compression.

In this case, according to the provision of the circumferential groove 27, when the compressive force is exerted on the load seal ring 2 in the axial direction, the load seal ring 2 is compressed in the axial direction, and reaction forces in the axially-outer direction according to the load seal ring 2 can be securely exerted on the lip portions 23 and 23. Thereby, stable sealing effects can be produced.

In the above seal assembly according to the first aspect of the invention, a cross section of the seal assembly may be symmetric with respect to a radial-direction line passing the center thereof.

In this case, since the cross section of the seal assembly is symmetric with respect to the radial-direction line passing the center thereof, the obverse side and the reverse side of the seal assembly are the same. This provides the advantage of facilitating mounting work of the seal assembly. Furthermore, only one type of pair of components, such as the seal rings 1 and 1, may be formed, the manufacturing cost can thereby be reduced.

According to a second aspect of the present invention, a crawler-track connection structure comprises a pin 8 to be inserted through superposed end portions of links 5 and 5; and a seal assembly S externally fitted on the pin 8 for preventing overflow of a lubricant to the outside, the lubricant being supplied to an outer peripheral side of the pin 8. One of the links 5 and 5 is immobilized on the pin 8, and the other one of the links 5 and 5 is supported on the pin 8 to be rotatable thereon. The seal assembly comprises a load seal ring 2 disposed between radial-direction walls W and W opposing each other along an axial direction, a first seal ring 1 comprising a lip portion 23 press-engaged with one of the radial-direction walls W and W according to a pressure exerted from the load seal ring 2, and a second seal ring 1 comprising a lip portion 23 press-engaged with the other one of the radial-direction walls W and W according to a pressure exerted from the load seal ring 2.

In the crawler-track connection structure according to the second aspect of the invention, with the seal assembly S being mounted between the radial-direction walls W and W opposing each other along the axial direction, the lip portions 23 and 23 are press-engaged with the corresponding walls W and W to thereby allow an inner-diameter side and an outer-diameter side-of the lip portions 23 and 23 to be hermetically enclosed. That is, in the seal assembly, the conventional space portions 94 shown in FIG. 6 are not required. Therefore, manufacturing processing and mounting work of the seal assembly S can be easily performed, and high-precision sealing effects can be produced.

The crawler-track connection structure according to the second aspect of the invention may further comprise a bushing 12 immobilized in the other one of the links 5 and 5 to be rotatable on the pin 8, and an end surface of the bushing 12 functions as the one of the radial-direction walls W and W.

In this case, one of the radial-direction walls W and W for receiving the seal assembly S can be formed using an end surface of the bushing 12. Thereby, the crawler-track connection structure can be simplified overall.

In addition, the crawler-track connection structure according to the second aspect of the invention may further comprise a bushing 12 immobilized in the other one of the links 5 and 5 to be rotatable on the pin 8, and a bushing 13 on the side of a sprocket 18, wherein the seal assembly S is inserted between the bushing 12 and the bushing 13.

In this case, the radial-direction walls W for receiving the seal assembly S can be formed using the bushing 12. Thereby, the crawler-track connection structure can be simplified overall, and the assembly work is facilitated, improving the productivity thereof.

The crawler-track connection structure according to the second aspect of the invention may further comprise a ring body 31 disposed in an inner-diameter side of the load seal ring 2 for controlling the displacement of the load seal ring 2 in a periphery inner direction.

In this case, the displacement of the load seal ring 2 in the periphery inner direction can be controlled by the inner-diameter controller body 31, and reaction forces of the load seal ring 2 in the axially-outer direction can be securely exerted on the lip portions 23 and 23. In addition, the inner-diameter controller body 31 functions as a spacer disposed in an inner-diameter side of the seal assembly to thereby allow a mounting portion of the seal assembly to easily be secured.

The crawler-track connection structure according to the second aspect of the invention may further comprise a dust seal ring 37 disposed in an outer peripheral side of the seal assembly S.

In this case, the dust seal ring 37 prevents the entrance of dust, mud, muddy water, and the like to the seal assembly S from the outer peripheral side. Thereby, the seal assembly S provides stable sealing effects, the quality of the crawler track can be improved, and the durability of the crawler track can be improved.

DESCRIPTION OF THE PREFERRED EMBODIMENTS

Figure 1A:
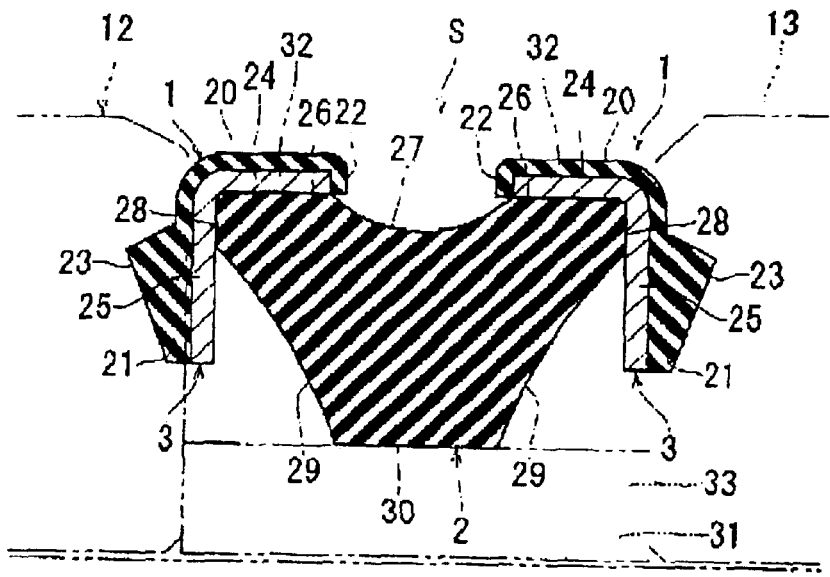
FIG. 1A is an essential-portion cross-sectional view of a Real assembly (premounted) according to an embodiment of the present invention.
Figure 1B:
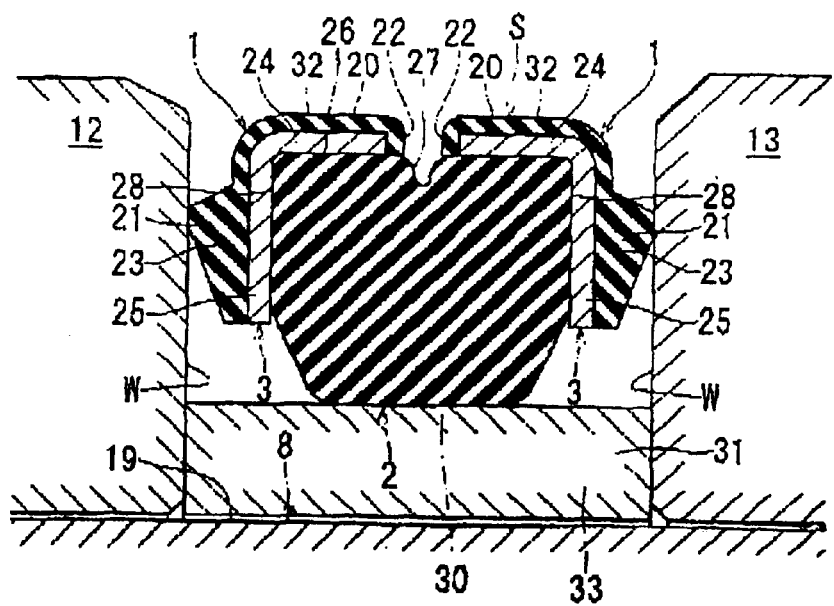
FIG. 1B is an essential-portion cross-sectional view of the seal assembly (postmounted)

Hereinbelow, referring to the accompanying drawings, practical embodiments of the present invention will be described in detail. FIGS. 1A and 1B are essential-portion cross-sectional views of an embodiment of a seal assembly according to the present invention. A seal assembly S is used for, for example, a crawler-track connection structure. The seal assembly S has a pair of seal rings 1 and 1 and load seal ring 2 disposed between the seal rings 1 and 1, and each of the seal rings 1 and 1 is supported by a support ring 3 that has an L-shaped cross section. In the cross-sectional view, the seal assembly S is formed symmetric with respect to a radial line passing the center of the assembly S. The crawler-track connection structure is intended for use in a traveling crawler of a crawler vehicle, such as a construction machine, e.g., a bulldozer tractor or a hydraulic shovel tractor.

Figure 2:
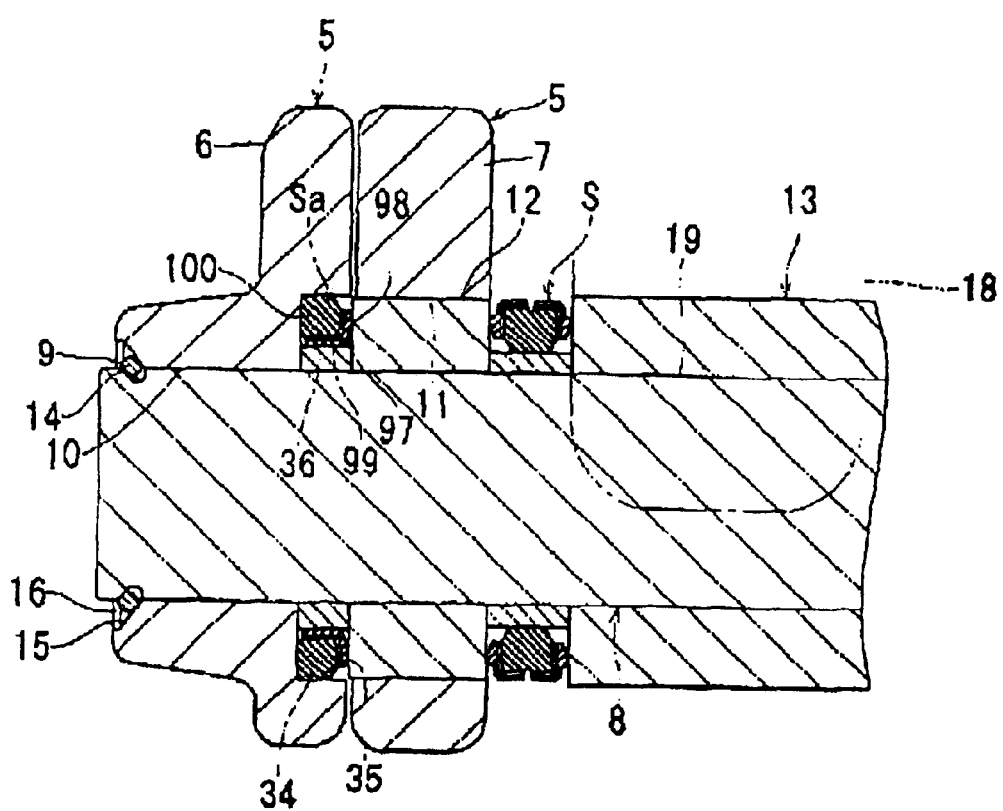
FIG. 2 is a cross-sectional view of a crawler-track connection structure according to an embodiment of the present invention.
Figure 6:
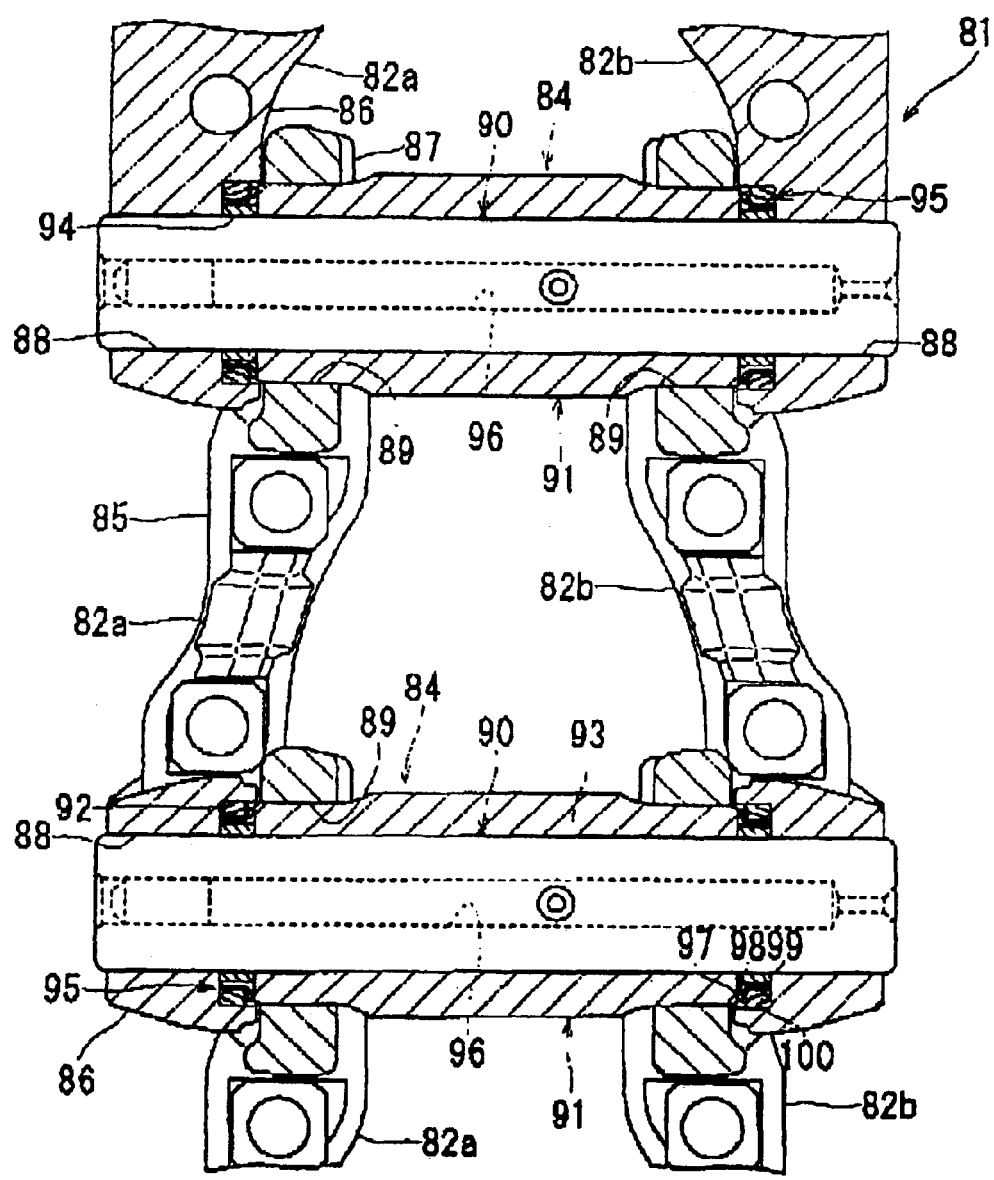
FIG. 6 is a cross-sectional view of a conventional crawler-track connection structure.
Figure 7:
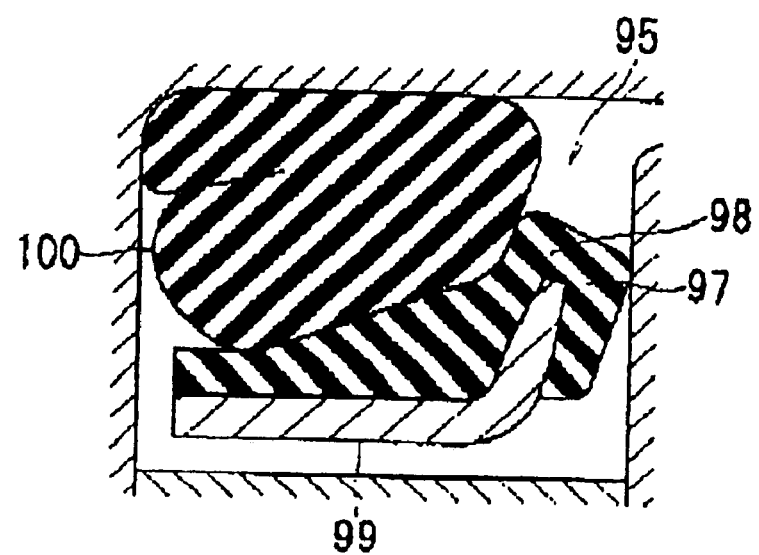
FIG. 7 is a cross-sectional view of a conventional seal assembly.

As shown in FIG. 2, the above-described connection structure connects links 5 and 5 in a state where a connecting portion 6 at an end portion of one of the links 5 and 5 is superposed on a connecting portion 7 at an end portion of the other link 5. Specifically, the individual link 5 has the connecting portion 6 on one end side, and the connecting portion 7 on the other and side, in which the connecting portion 6 and the connecting portion 7 of the adjacent links 5 and 5 are connected together via the connection structure. As shown in FIG. 6, in the individual links 5, an intermediate portion (not shown) is formed between the connecting portion 6 and the connecting portion 7, and shoe plates are disposed in the intermediate portion. In addition, although not shown in FIG. 2, links 5 and 5 are similarly connected together at the other end portion of a pin 8.

The connection structure comprises a fallout prevention pin 9 externally fitted around the pin 8. Specifically, a pin insertion opening 10 is provided in the connecting portion 6 of the link, and a bushing insertion opening 11 is provided in the connecting portion 7 of the link 5, in which an and portion of tile pin 8 is press-fitted into the pin insertion opening 10, and a bushing 12 is press-fitted into the bushing insertion opening 11 of the connecting portion 7 to be rotatable around the pin 8. In addition, another bushing 13 externally fitted around the pin 8, that is, a bushing on the side of a sprocket 18 described below, is provided between the connecting portions 6 of the links 5 and 5 opposing each other at a predetermined space (in the drawing, opposing links 5 and 5 on the other side are omitted). The seal assembly 5 of the present invention is provided between the bushings 12 and 13. An end surface of the bushing 12 on the one side and an end surface of the bushing 13 on the other side function as radial-direction walls W and W, on which lip portions 23 and 23 are provided, respectively. A conventional seal assembly Sa is provided between the bushing 12 and the connecting portion 6 of the link 5 on the one side.

A circumferential U-shaped groove 14 is provided at an end portion of the pin 8, and a tapered face 15 is provided around a peripheral portion of the pin insertion opening 10 to reduce the diameter of the opening inwardly in the axial direction. The tapered face 15 and the circumferential U-shaped groove 14 together form a circular space 16. The fallout prevention pin 9 is elastically flexible in diameter, and it is fitted in the circular space 16 to thereby fix the link 5 and the pin 8 together. The links 5 are thus connected to form a link chain. The link chain is engaged with a sprocket 18 (refer to FIG. 2) of a crawler vehicle, such as a construction machine. An oil injection opening (not shown) is provided in the pin 8. Oil in the oil injection opening flows to the side of an outer peripheral face 19 and serves as a lubricant between the pin 8 and the bushing 12.

As shown in FIGS. 1A and 1B, the seal ring 1 in the seal assembly S is formed of, for example, a urethane resin having the hardness of about Hs 95. The seal ring 1 comprises a first portion 20, a second portion 21, and a pendulous peripheral wall 22. The first portion 20 is provided on an outer peripheral side, and extends in the axial direction. The second portion 21 inwardly extends in a radial direction from an axial-direction outer portion of the first portion 20. The pendulous peripheral wall 22 inwardly extends in the radial direction to an axial-direction inner portion of the first portion 20. The lip portion 23 has a triangular cross section outwardly protruding in the axial direction, and it is provided in the second portion 21.

The support ring 3 is formed of metal, and it is disposed on a reverse-face side of the seal rings 1. The support ring 3 comprises a first portion 24 and a second portion 25. The first portion 24 engages with the first portion 20 of the seal ring 1, the second portion 25 engages with the second portion 21 of the seal ring 1, and an inner surface of the pendulous peripheral wall 22 of the seal ring 1 engages with an end surface of the support ring 3. Thus, the aforementioned portions are unitized with the seal ring 1.

The load seal ring 2 is formed of, for example, NBR having the hardness of about Hs 90. The load seal ring 2 is formed of a ring body that has a substantially trapezoidal cross section in which a circumferential groove 27 is provided on an outer peripheral surface 26. Specifically, cutout portions 29 and 29 are provided on two end surfaces 28 and 28, respectively, in which the axial-direction length of an inner peripheral surface 30 is less than the axial-direction length of the outer peripheral surface 26. Therefore, when an axial direction compressive force is exerted on the load seal ring 2, the axial-direction length of the load seal ring 2 is reduced. On the other hand, the outer peripheral surface 26 of the load seal ring 2 engages with an inner peripheral surface of the first portion 24 of the support ring 3, and the end surface 28 of the load seal ring 2 engages with an inner surface of the second portion 25 of the support ring 3.

In a free state shown in FIG. 1A, the axial-direction length of the seal assembly S is larger than the dimension between the bushings 12 and 13, and a ring body 31 is provided between the bushings 12 and 13. In this case, the outer diameter of the ring body 31 is arranged to be substantially the same as the inner diameter of the aforementioned load seal ring 2. Thereby, the ring body 31 controls the displacement of the load seal ring 2 in the periphery inner direction, and controls the reduction in the dimension between the bushings 12 and 13.

In the free state, the seal assembly S configured as described above is greater than the dimension between the bushings 12 and 13. Therefore, as shown in FIG. 1B, when seal assembly S is disposed between the bushings 12 and 13, it receives an axial-direction compressive force. When the seal assembly S receives the axial-direction compressive force, the axial-direction length of the load seal ring 2 is reduced. In this case, the ring body 31 functions as an inner-diameter controller body 33 for controlling the displacement of the load seal ring 2 in the periphery inner direction. In addition, the first portion 24 of the load seal ring 2 functions as an outer-diameter controller body 32 for controlling the displacement of load seal ring 2 in the periphery outer direction. This ensures that reaction forces are exerted on the lip portions 23 and 23 outwardly in the axial direction from the load seal ring 2.

As described above, when the load seal ring 2 is compressed in the axial direction, the reaction forces can be obtained. According to the reaction force, the lip portion 23 of the first seal ring 1 (which hereinbelow will refer to the seal ring 1 on the side of the bushing 12) in press-engaged with the end surface (that is the radial-direction wall W) of the bushing 12. Concurrently, the lip portion 23 of the second seal ring 1 (which hereinbelow will refer to the seal ring 1 on the side of the bushing 13) is press-engaged with the end surface (that is, the radial-direction wall W) of the bushing 32. Thereby, an inner-diameter side and an outer-diameter side of the lip portion 23,23 can be hermetically enclosed to allow a seal function to be implemented. Therefore, use of the seal assembly S avoids the necessity of the provision of walls for receiving the outer peripheral side and the space portion 94. In addition, the use of the seal assembly S avoids the necessity of the conventionally required space portions 94 (shown in FIG. 6) provided to insert the seal assembly S. Thereby, the crawler-track connection structure can be simplified; and furthermore, the seal assembly S need not be inserted into the housings 94. This allows the efficiency in assembly to be improved. In addition, the seal assembly S is formed to have the cross section symmetric with respect to the radial-direction line passing the center of the assembly. Therefore, the obverse side and the reverse side of the seal assembly S are the same. This provides an advantage in that the seal assembly S can be easily inserted. Furthermore, since only one type of pair of components, such as the seal rings 1 and 1 or the support rings 3 and 3, may be formed, the manufacturing cost can thereby be reduced. In the above, there is still another advantage in that since the load seal ring 2 is also formed symmetric with respect to the aforementioned radial-direction line, the manufacture thereof is facilitated.

As shown in FIG. 2, in the above-described crawler-track connection structure, the conventional seal assembly Sa is inserted between the connecting portions 6 and 7 of the links 5 and 5 in the manner described above. The seal assembly Sa comprises the seal ring 98 having the lip portion 97, the support ring 99 for supporting the seal ring 98, and the load ring 100 for receiving a pressure from the lip portion 97 of the seal ring 98. More specifically, with the pin insertion opening 10, the opening portion on the busing side is used as a large-diameter portion, a space portion (housing) 34 is formed using the large-diameter portion 35, the end surface of the bushing 12, and the outer peripheral face 19 of the pin 8. Therefor, the seal assembly Sa prevents overflow of the lubricant from the side of the outer peripheral face 19 of the pin 8 to the outside between the links 5 and 5, which are connected together. In addition, a spacer 36 to be fitted around the pin 8 is disposed on the inner-diameter side of the load ring 100.

Figure 3:
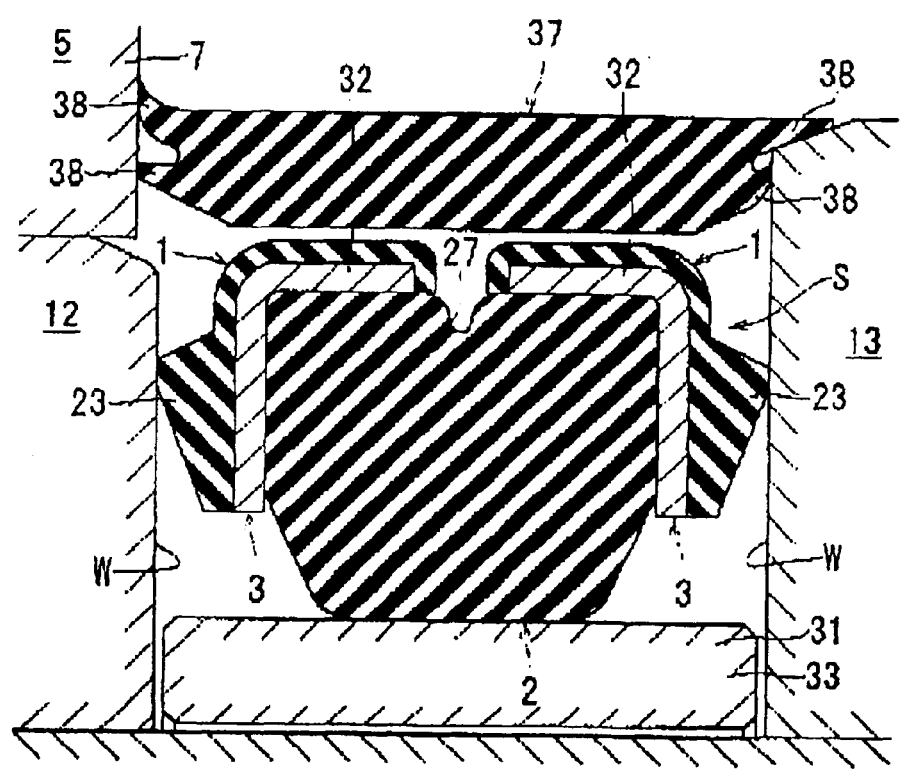
FIG. 3 is an essential-portion cross-sectional view showing a disposed state of a dust seal ring according to the present invention.

In the crawler-track connection structure shown in FIG. 2, since the outer peripheral side of the seal assembly S is in an open state, mud, muddy water, dust, and the like can enter the seal assembly S through the outer peripheral side. To prevent the entrance, as shown in FIG. 3, it is preferable that a dust seal ring 37 be disposed. The dust seal ring 37 is formed of a ring body having a cross section substantially shaped as an irregular rectangle. In addition, the dust seal ring 37 has lip portions 38 and 38 on two end surfaces, and is provided between a connecting portion 7 of a link 5 and a bushing 13. This configuration securely prevents the entrance of dust and the like from the outside. Furthermore, the above configuration prevents overflow of the lubricant and the like from the interior of the seal assembly S to the outside.

Figure 4A:
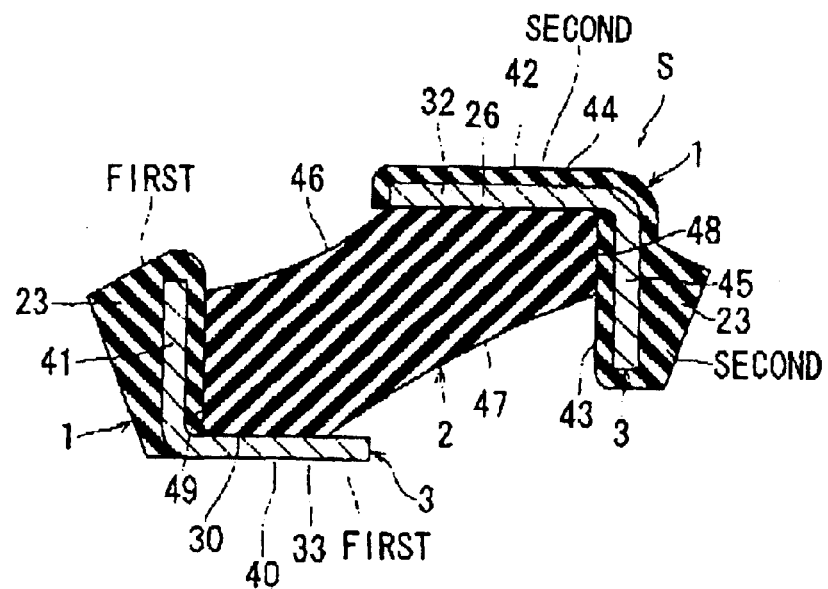
FIG. 4A is an essential-portion cross-sectional view of a seal assembly (premounted) according to another embodiment of the present invention.
Figure 4B:
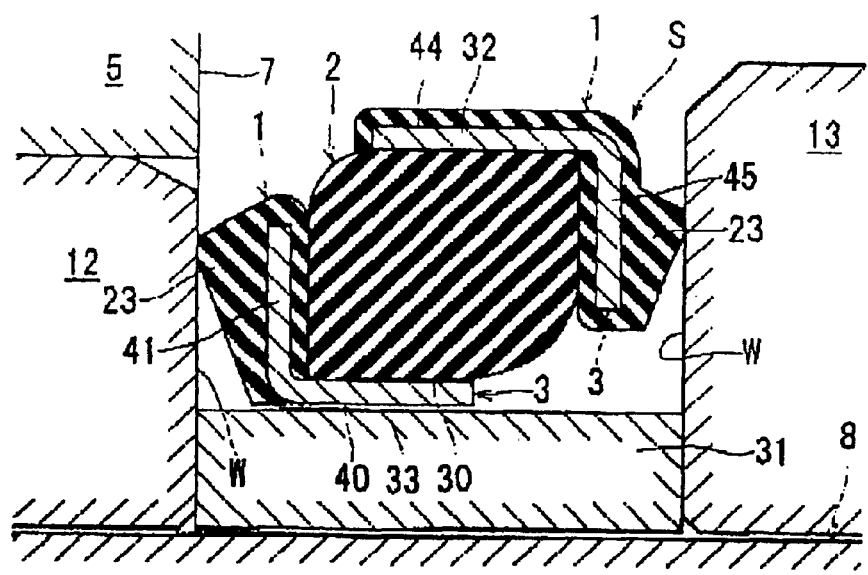
FIG. 4B is an essential-portion cross-sectional view of the seal assembly (postmounted)

FIGS. 4A and 4B show another embodiment of a seal assembly. This embodiment is different from the above-described embodiment in that a pair of seal ring 1 and 1 are shaped different from each other. Specifically, one of the seal rings 1 and 1 (which hereinbelow will be referred to as a first seal ring 1) is formed of a ring body having a cross section substantially shaped as a trapezoid. A first support ring 3 for supporting the first seal ring 1 comprises a first portion 40 and a second portion 41. The first portion 40 is disposed in an inner-diameter side and extends in the axial direction, and the second portion 41 extends outwardly in the radial direction from an axial-direction outer end portion of the first portion 40. The second portion 41 is buried in the first seal ring 1. On the other hand, the other seal ring 1 (which hereinbelow will be referred to as a second seal ring 1) comprises a first portion 42 and a second portion 43. The first portion 42 is disposed in an outer-diameter side, and extends in the axial direction. The second portion 43 extends outwardly in the radial direction from an axial-direction outer end portion of the first portion 42, and a lip portion 23 is provided in the second portion 43. A second support ring 3 for receiving the second seal ring 1 comprises a first portion 44 and a second portion 45. The first portion 44 is disposed in an outer-diameter side, and extends in the axial direction. The second portion 45 extends inwardly in the radial direction from an axial-direction outer end portion of the first portion 44. The second portion 45 is buried in the second portion 43 of the second seal ring 1.

In a load seal ring 2, a cutout portion 46 is formed on the side of the first seal ring 1 of an outer peripheral surface 26, and a cutout portion 47 is formed on the side of the second seal ring 1 of an inner peripheral surface 30. In addition, when the load seal ring 2 is provided, the outer peripheral surface 26 engages with an inner peripheral surface of the first portion 44 of the second support ring 3, an outer end surface 48 (a surface corresponding to the second seal ring 1) thereof engages with an inner surface of the second portion 43 of the second seal ring 1, the inner peripheral surface 30 thereof engages with an outer peripheral surface of the first portion 40 of the first support ring 3, and an outer end surface 49 (a surface corresponding to the first seal ring 1) thereof engages with an inner surface of the first seal ring 1.

Also in this case, the axial-direction length in a free state is larger than the length between the bushings 12 and 13, and as shown in FIG. 4B, the seal assembly S is disposed between the bushings 12 and 13. In this case, the aforementioned cutout portions 46 and 47 are used as circumferential grooves 27 and 27 each tolerating axial-direction compression of the load seal ring 2, and the axial-direction length of the seal assembly S is thereby reduced. Concurrently, the first portion 40 of the first support ring 3 receives the load seal ring 2 from the inner-diameter side, and the first portion 44 of the second support ring 3 receives the load seal ring 2 from the outer-diameter side. Thereby, the outer and surface 49 functions as an inner-diameter controller body 33 for controlling the displacement of the load seal ring 2 in the periphery inner direction. In addition, the first portion 44 of the load seal ring 2 functions as an outer-diameter controller body 32 for controlling the displacement of load seal ring 2 in the periphery outer direction. Accordingly, the displacement of the load seal ring 2 in the radial direction is controlled, reaction forces are exerted on the lip portions 23 and 23 outwardly in the axial direction, and the lip portions 23 and 23 closely contact the bushings 12 and 13, respectively. Thereby, a high-precision seal function can be implemented.

Figure 5A:
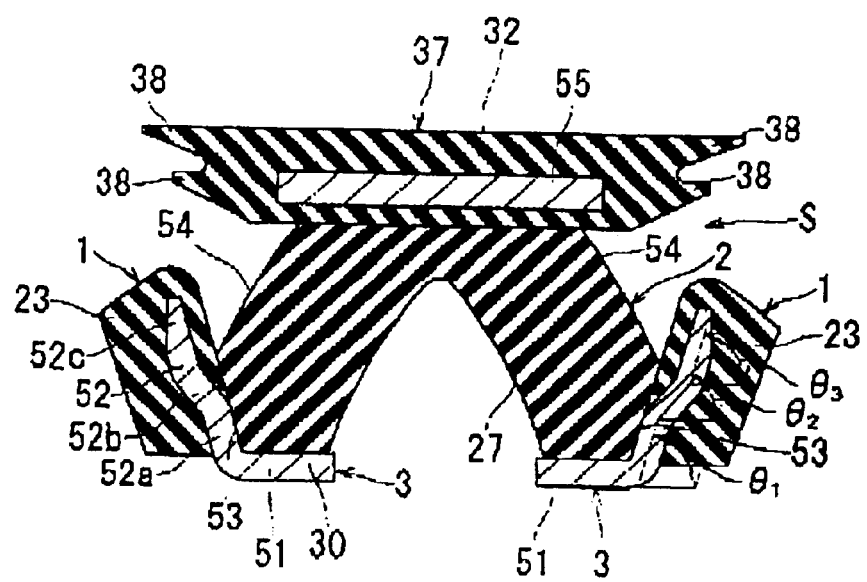
FIG. 5A is an essential-portion cross-sectional view of a seal assembly (premounted) according to still another embodiment of the present invention.
Figure 5B:
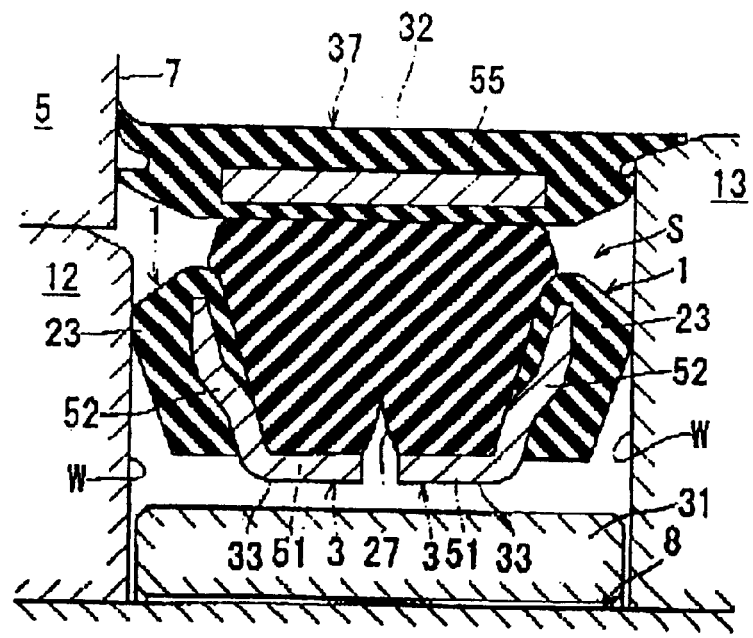
FIG. 5B is an essential-portion cross-sectional view of the seal assembly (postmounted)

FIGS. 5A and 5B show a still another embodiment of a seal assembly. In this case, each of seal rings 1 and 1 is formed of a ring body having a cross section substantially shaped as a trapezoid, and a corner portion on an outer side thereof in the axial direction is used as a lip portion 23. A support ring 3,3 is formed of a first portion 51 and a second portion 52. In an inner-diameter side, the first portion 51 extends in the axial direction, and the second portion 52 extends in the radial direction from an outer end portion of the first portion 51. In this case, the second portion 52 expands outwardly in the axial direction; and it is formed of an inner diameter portion 52a, an intermediate portion 52b, and an outer diameter portion 52c, and is buried in the seal ring 1. Specifically, although the intermediate portion 52b and the outer diameter portion 52c are completely buried therein, an inner surface of the inner diameter portion 52a is exposed to the outside. When $\theta_1$ represents the expansion angle of the inner diameter portion 52a, $\theta_2$ represents the expansion angle of the inner diameter portion 52b, and $\theta_2$ represents the expansion angle of the inner diameter portion 52c, the relationship thereof is $\theta_2 < \theta_1 < \theta_3$. However, the relationship is not restricted thereto.

In the present embodiment, a load seal ring 2 is formed of a ring body having a cross section substantially shaped as a letter V turned upside down. A circumferential groove 27 is formed on an inner peripheral surface 30. Two end surfaces are each formed of an inner-diameter-side slanting surface 53 and an outer-diameter-side slanting surface 54. The diameter of the inner-diameter-side slanting surface 53 increases along the direction of an outer-diameter side, whereas the diameter of the outer-diameter-side slanting surface 54 decreases along the direction of an outer-diameter side. An inner peripheral surface 30 of the load seal ring 2 engages with an outer peripheral surface of a first portion 51 of a support ring 3, and the inner-diameter-side slanting surface 53 engages with the inner diameter portion 52a of the support ring 3 or an inner surface of the seal ring 1.

A dust seal ring 37 is disposed on an outer-diameter side of the load seal ring 2. In this case, a core member 55 is buried in the dust seal ring 37. Specifically, the dust seal ring 37 is used to form an outer-diameter controller body 32 for controlling the displacement of load seal ring 2 in the direction of the outer-diameter side.

Also in this case, the axial-direction length in a free state is larger than the length between the bushings 12 and 13, and as shown in FIG. 5B, the seal assembly S is disposed between the bushings 12 and 13. In this case, since the circumferential groove 27 is provided, the load seal ring 2 tolerates compression in the axial direction of the load seal ring 2, and the axial-direction length of the seal assembly S is thereby reduced. Concurrently, the first portion 51 of the first support ring 3 functions as an inner-diameter controller body 33 for controlling the displacement of the load seal ring 2 in the direction of the inner-diameter side. In addition, the dust seal ring 37 functions as an outer-diameter controller body 32 for controlling the displacement of the load seal ring 2 in the direction of the outer-diameter direction. Accordingly, the displacement of the load seal ring 2 in the radial direction is controlled, reaction forces are exerted on the lip portions 23 and 23 outwardly in the axial direction, and the lip portions 23 and 23 closely contact the bushings 12 and 13, respectively. Thereby, a high-precision seal function can be implemented. Furthermore, the above-described structure securely prevents the entrance of dust and the like from the outside.

As above, while the present invention has been described with reference to the practical embodiments of the seal assembly, the invention is not limited thereto. On the contrary, the invention may be implemented with various modifications within the spirit and scope of the invention. For example, in the embodiment of the seal assembly shown in FIGS. 1A and 1B, the cross section of the circumferential groove 27 is not limited to be semicircular, but may be modified to have various other shapes, for example, a semielliptical or semi-lengthen-circular shape, a V shape, and a rectangular shape. This may also be applied to the shape of the circumferential groove 27 of the seal assembly shown in FIGS. 5A and 5B. In addition, in the seal assembly shown in FIGS. 4A and 4B, the diameter of the seal ring 1 on the side of the bushing 13 is relatively large, and the seal ring 1 on the side of the bushing 12 is relatively small. However, the relationship of the diameters may be reverse. That is, the diameter of the seal ring 1 on the side of the bushing 13 may be relatively small, and the seal ring 1 on the side of the bushing 12 may be relatively large. Furthermore, in the crawler-track connection structure shown in FIG. 2, the seal assembly S may be used instead of the seal assembly Sa disposed in the housing 34.

What is claimed is:

1. A seal assembly comprising;
   a pair of seal rings individually comprising lip portions disposed such that each of said lip portions protrudes in a direction opposing an axial direction; and
   a load seal ring compressed and inserted between said seal rings, said load seal ring exerting reaction forces on said lip portions outwardly in the axial direction, and said load seal ring has an inner peripheral surface with an axial-direction length less than an outer peripheral surface, wherein one of said pair of seal rings comprises an outer-diameter controller body for controlling the displacement of said load seal ring in the periphery outer direction, and the other one of said pair of seal rings comprises an inner-diameter controller body for controlling the displacement of said load seal ring in the periphery inner direction.

2. The seal assembly as defined in claim 1, further comprising an outer-diameter controller body for controlling the displacement of said load seal ring in a periphery outer direction.

3. The seal assembly as defined in claim 1, further comprising an inner-diameter controller body for controlling the displacement of said load seal ring in a periphery inner direction.

* * * * *